(12) United States Patent
Beraud et al.

(10) Patent No.: US 10,088,680 B2
(45) Date of Patent: Oct. 2, 2018

(54) HEAD-UP DISPLAY FOR A MOTOR VEHICLE

(71) Applicant: VALEO COMFORT AND DRIVING ASSISTANCE, Créteil (FR)

(72) Inventors: Henry Beraud, Creteil (FR); Patrick Corduan, Creteil (FR)

( * ) Notice: Subject to any disclaimer, the term of this patent is extended or adjusted under 35 U.S.C. 154(b) by 0 days.

(21) Appl. No.: 15/528,949

(22) PCT Filed: Nov. 27, 2015

(86) PCT No.: PCT/FR2015/053252
§ 371 (c)(1),
(2) Date: May 23, 2017

(87) PCT Pub. No.: WO2016/083762
PCT Pub. Date: Jun. 2, 2016

(65) Prior Publication Data
US 2017/0307885 A1   Oct. 26, 2017

(30) Foreign Application Priority Data

Nov. 28, 2014 (FR) .................................... 14 61681

(51) Int. Cl.
*G02B 26/08* (2006.01)
*G02B 27/01* (2006.01)
(Continued)

(52) U.S. Cl.
CPC .......... *G02B 27/0149* (2013.01); *B60K 35/00* (2013.01); *F16H 21/44* (2013.01);
(Continued)

(58) Field of Classification Search
CPC ...... G02B 27/01; G02B 7/182; G02B 7/1821; G02B 27/0149; G02B 26/0816;
(Continued)

(56) References Cited

U.S. PATENT DOCUMENTS 6,808,274 B2 * 10/2004 Raines ............... G02B 27/0149
359/841

FOREIGN PATENT DOCUMENTS

EP    1 550 572 A1    7/2005
EP    2 322 972 A1    5/2011
(Continued)

OTHER PUBLICATIONS

International Search Report issued in PCT/FR2015/053252 dated Feb. 5, 2016 (3 pages).
(Continued)

*Primary Examiner* — Euncha Cherry
(74) *Attorney, Agent, or Firm* — Osha Liang LLP

(57) ABSTRACT

The invention relates to a head-up display (1) comprising: a reflecting mirror (9) held by a mirror holder (15) articulated about a pivoting axis (17); and a motor-driven system (31) for pivotably moving said reflecting mirror (9), comprising a motor unit (33), characterised in that the motor-driven system (31) comprises a connecting rod (35) extending in a direction perpendicular to the pivoting axis (17), the first end portion (35) of said connecting rod being engaged with the mirror holder (15) in an articulated manner, and a second end portion (39) thereof, opposite the first (37), being engaged with a rotary output body (47, 49) of the motor unit (33).

10 Claims, 4 Drawing Sheets

(51) Int. Cl.
*G02B 7/182* (2006.01)
*F16H 21/44* (2006.01)
*B60K 35/00* (2006.01)
*F16C 7/02* (2006.01)

(52) U.S. Cl.
CPC ........ *G02B 7/1821* (2013.01); *G02B 26/0816* (2013.01); *B60K 2350/1072* (2013.01); *B60K 2350/2052* (2013.01); *F16C 7/02* (2013.01); *G02B 2027/0159* (2013.01)

(58) Field of Classification Search
CPC ............ G02B 2027/0159; B60K 35/00; B60K 2350/1072; B60K 2350/2052; F16C 7/00; F16C 7/02; F16H 21/44
USPC ...................................................... 359/221.3
See application file for complete search history.

(56) References Cited

FOREIGN PATENT DOCUMENTS

| | | |
|---|---|---|
| FR | 1 079 986 A | 12/1954 |
| JP | 2000-137189 A | 5/2000 |
| JP | 2009-184406 A | 8/2009 |

OTHER PUBLICATIONS

Written Opinion of the International Searching Authority issued in PCT/FR2015/053252 dated Feb. 5, 2016 (6 pages).

\* cited by examiner

HEAD-UP DISPLAY FOR A MOTOR VEHICLE

TECHNICAL FIELD OF THE INVENTION

The invention relates to a head-up display device for a motor vehicle.

TECHNOLOGICAL BACKGROUND

The invention will have applications, for example, in motor vehicles for informing and/or guiding the users of the vehicle, in particular its driver.

It is known to equip a motor vehicle with head-up display equipment, also known as a head-up display or HUD (standing for "Head-Up Display" in English). Such a display is placed in the field of vision of the motor vehicle's driver and displays information relative to the state of the vehicle, the traffic or other things.

This type of head up display device for a motor vehicle makes it possible to obtain an image with sufficient brightness for the user, and notably the driver of the vehicle, to be able to see the image sufficiently, and in any situation, day or night and according to the meteorological conditions (sunny or cloudy).

Among the possible technologies for forming such an image by means of the head-up display device, the one most used in the prior art is the liquid crystal display technology, notably the TFT-LCD (standing for "Thin-Film Transistor Liquid Crystal Display" in English) technology. These TFT-LCD display screens necessitate, for the display of an image, backlighting generally carried out by a plurality of light emitting diodes or LEDs (LED standing for "Light-Emitting Diode" in English). In practice, this TFT-LCD screen and the backlighting are comprised in an assembly called an image generating device and also known by the English word "imager".

Downstream of the screen in the direction of movement of the light beams, the head-up display device generally comprises a semi-reflecting lamina, called a "combiner" in English, or a semi-reflecting area of windscreen and, between the screen and the combiner or windscreen, a reflection device with one or more flat or concave mirrors.

This image is displayed through the semi-reflective lamina and with magnification by reflection and seems to appear beyond, and therefore in front of the windscreen of the vehicle.

However, as a function of the users, it is necessary to be able to adjust the position, notably the height, of the image projected on the windscreen in order to take account for example of the height of the driver.

At present, head-up display devices are known where a motor is engaged directly or via pinions or endless screws, with a pivoting axis of the last deflecting mirror, which makes it possible to adjust the height of the image on the windscreen.

However, the system is very sensitive such that it is necessary to use stepper motors with very fine angular resolution which are very costly. Moreover, the known systems are subject to vibration problems when the vehicle is moving. If the projected image also vibrates it would then be difficult to read or would even be illegible.

Purposes of the Invention

The invention aims to overcome at least some of the above disadvantages.

In particular, the invention aims to provide a head-up display device of which the deflecting mirror can be adjusted with a standard stepper motor.

DESCRIPTION OF THE INVENTION

For this purpose, the invention relates to a head-up display device comprising:
 a deflecting mirror held by a mirror holder articulated about a pivoting axis,
 a motor-driven system for moving the deflecting mirror in a pivoting manner, comprising a motor unit, characterized in that the motor-driven system comprises a connecting rod extending in a direction perpendicular to the pivoting axis and of which a first end portion is engaged with the mirror holder in an articulated manner and of which a second end potion, opposite to the first end portion, is engaged with a rotary output member of the motor unit.

Thus, the motor unit can be placed at a distance from the mirror so that the arrangement can be more easily adapted to small spaces.

The head-up display device can comprise moreover one or more of the following features taken alone or in combination:

According to one aspect, the motor unit is placed in an optically dead zone for said display device.

The expression "optically dead" means a zone where, even in bright external illumination, for example sunrays, reflected rays do not reach the display of the display device, notably on the windscreen, nor is it esthetically visible from the outside: only the lateral connecting rod can be party visible, which is not annoying.

According to another aspect, the first end portion of the connecting rod is articulated onto the mirror holder close to an edge, distant from the pivoting axis.

In fact, the farther away it is from the pivoting axis, the longer is the path to be traveled by the connecting rod in order to apply a movement of rotation/pivoting to the mirror. Thus, the system becomes more accurate and it is possible to use drive motors with lower resolution.

The first end portion of the connecting rod can be is engaged with an actuating spindle carried by the mirror holder and parallel with the pivoting axis of the mirror.

The second end portion of the connecting rod can be engaged with a tenon carried by a rotary disk driven by the motor unit.

Moreover, the connecting rod comprises for example, at each of its first and second end portions, an opening respectively engaged with the actuating spindle and the tenon.

According to yet another aspect, each opening has a portion with a generally "V" or "U" shape whose bottom has a spacing less than the diameter of the actuating spindle or of the tenon with which it cooperates.

Thus, the tenon cylinder is held in the "V" or the "U" and it has no translational play problem, which would be caused by tolerances.

The openings are for example open (contour not closed) in the direction of a base of the head-up display device, which facilitates assembly. Alternatives with openings having a closed contour can also be envisaged.

The display device comprises, notably for each end portion, an elastic element, notably a spring element, respectively maintaining the actuating spindle and the tenon engaged with the lateral walls of the "V" or "U" shaped portion.

Maintaining contact with the lateral walls of the "V" or "U" contribute to eliminating the effects of tolerances in this system of control of the pivoting of the deflecting mirror.

According to yet another aspect, the spring element is a helical tension spring one end of which is engaged with the connecting rod and the other end of which is engaged with an associated anchoring point disposed in such a way that the spring is substantially oriented perpendicular to the axis of the connecting rod and perpendicular the pivoting axis.

The substantially perpendicular effect does not apply force in the direction of translation of the connecting rod, nor a pressure return effect or spring effect, making it possible to press the connecting rod at each end against the bottom of its "V" or "U" shaped grooves.

The connecting rod can comprise, notably in each end portion, a cut-out hook serving as an engagement point at one end of the helical spring.

The distance between the openings is for example between 40 mm and 160 mm, notably 90 mm.

The motor unit comprises for example a motor reducer.

Other advantages and features will become apparent on reading the description of the invention and from the appended drawings in which.

Figure 2:
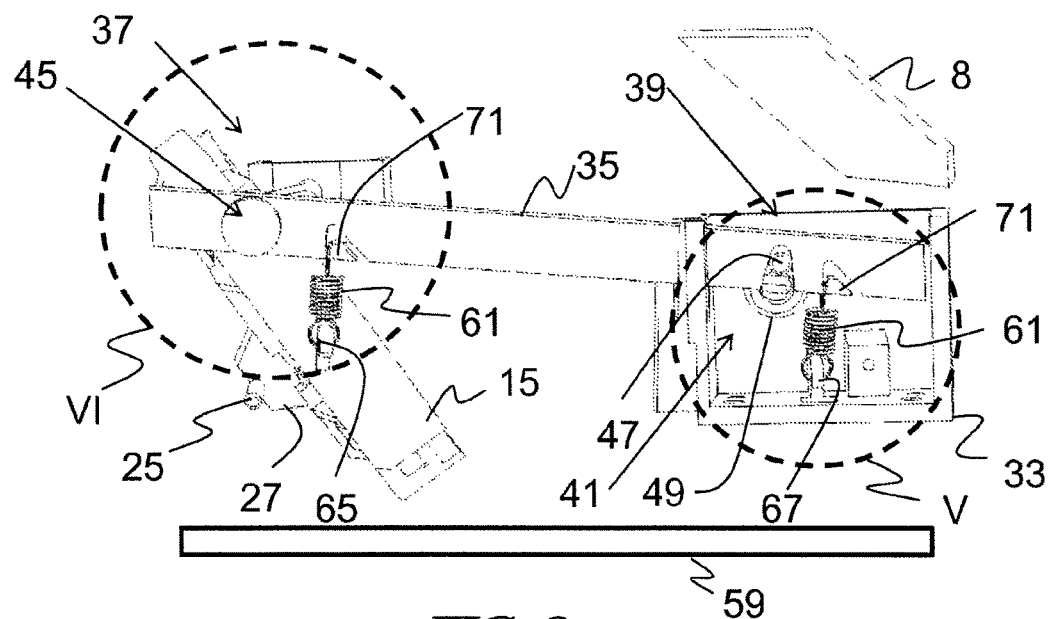
FIG. 2 shows a side view of certain elements of the head-up display device according to the invention.
Figure 3:
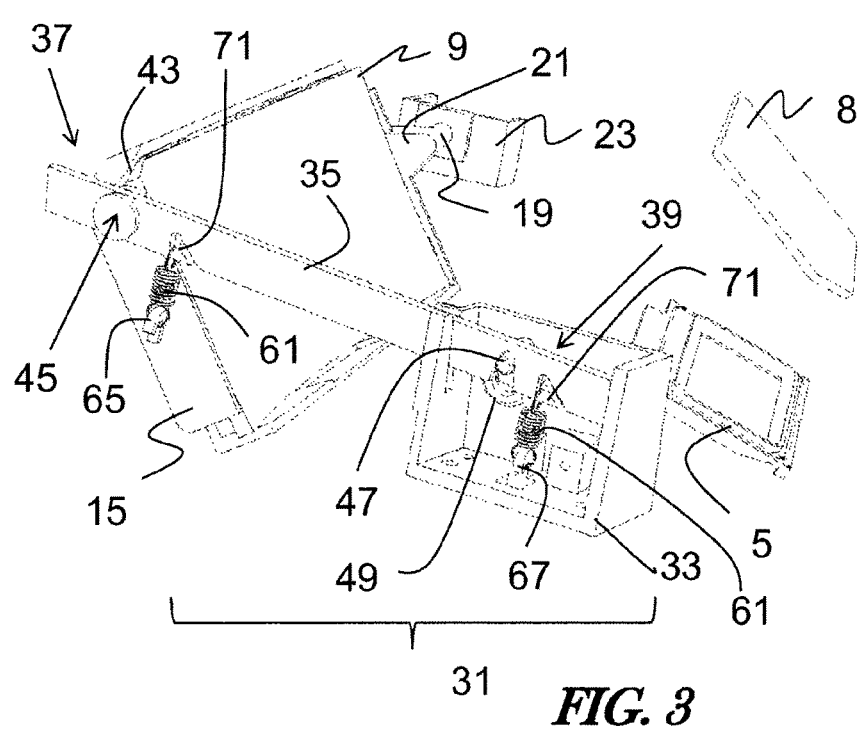
Figure 4:
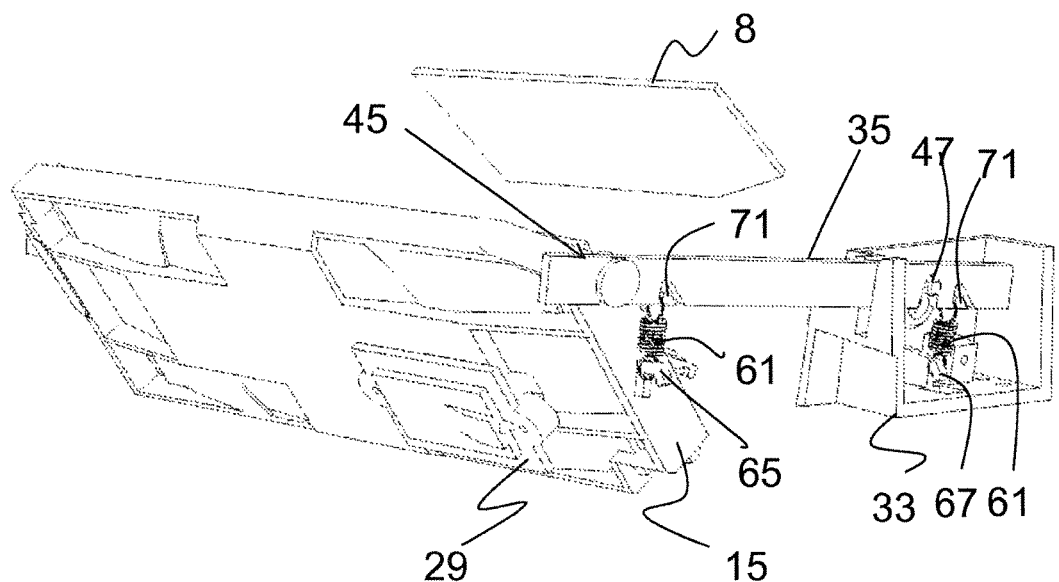
Figure 5:
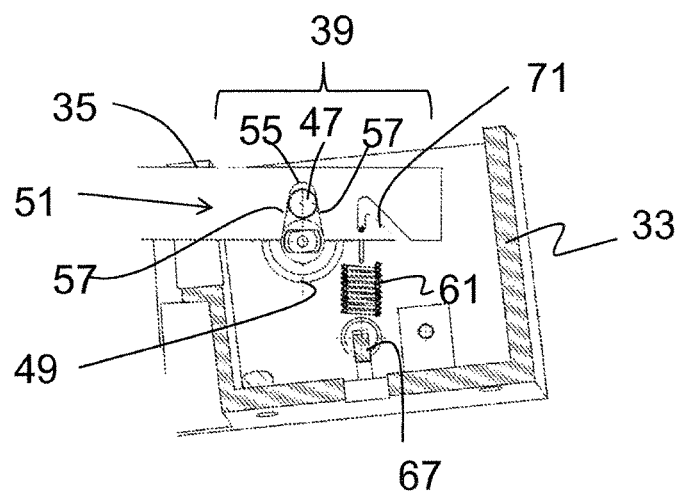
Figure 6:
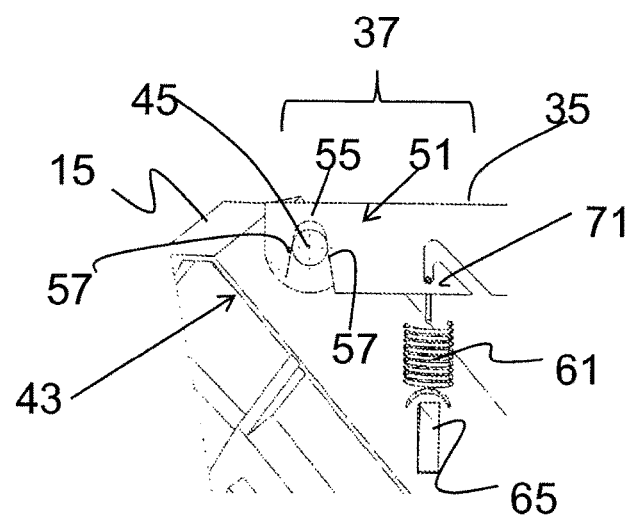
Figure 7:
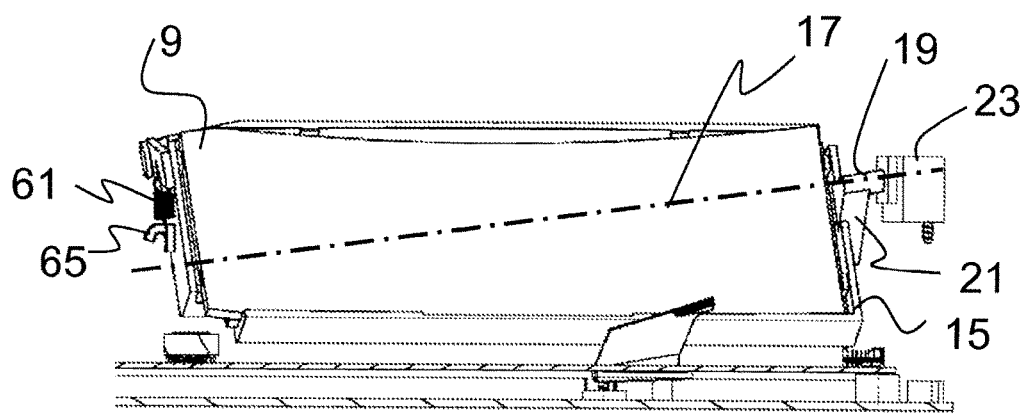

FIG. 3 shows a raised perspective view of the head-up display device shown in FIG. 2, FIG. 4 shows a perspective view of the rear of the head-up display device shown in FIG. 2, FIG. 5 shows a diagrammatic cross-sectional view of a detail V of FIG. 2, FIG. 6 shows a diagrammatic cross-sectional view of a detail VI of FIG. 2, and FIG. 7 shows a front view of the deflecting mirror of the head-up display device shown in FIG. 2.

Identical elements have the same reference numbers in all of the figures.

An example embodiment will now be described with reference to the figures.

The following embodiments are examples. Although the description refers to one or more embodiments, this does not necessarily signify that each reference relates to the same embodiment, or that the features apply solely to a single embodiment. Single features of different embodiments can also be combined in order to provide other embodiments.

Figure 1:
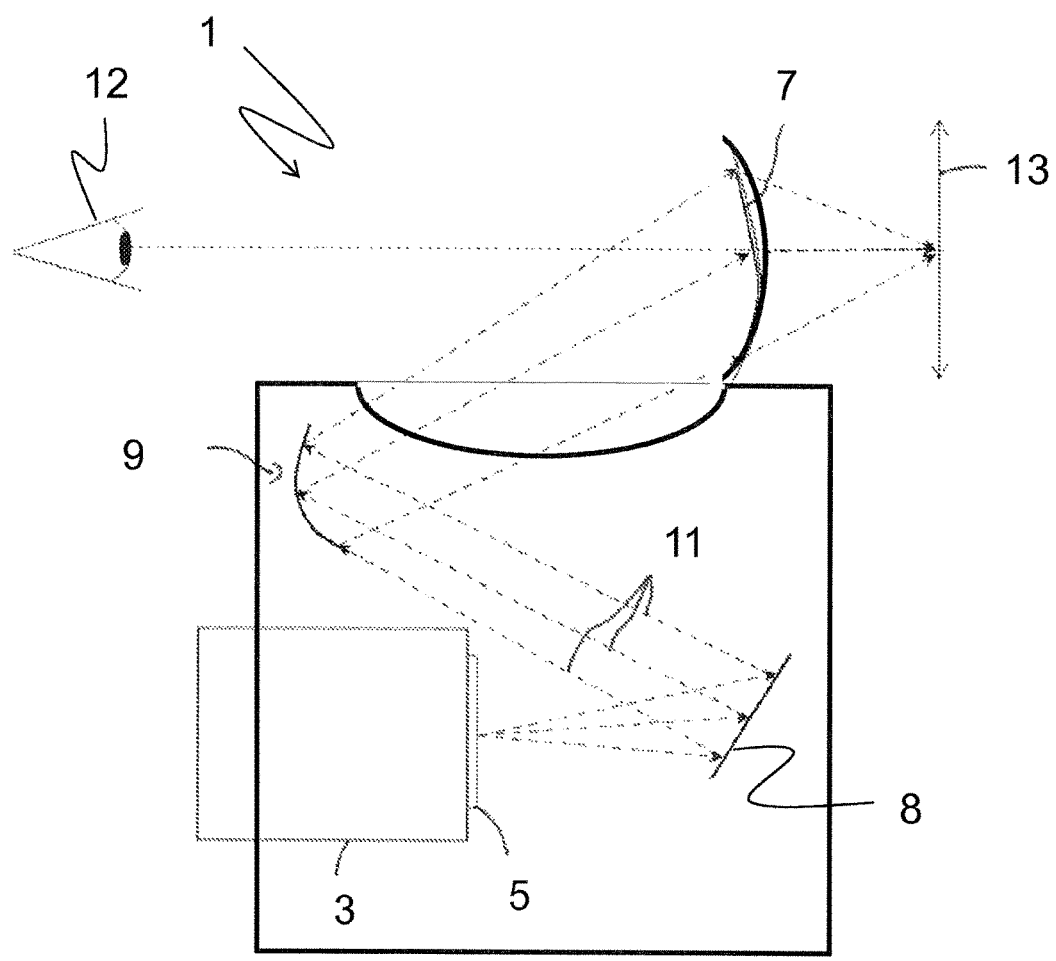
FIG. 1 shows a head-up display device in diagrammatic manner.

FIG. 1 shows a diagram of a head-up display device 1.

This display device 1 comprises an image generating device 3, the imager.

This image generating device 3 comprises for example a liquid crystal display screen (LCD screen) for example comprising thin film transistors, and an integrated backlighting device (not shown). The liquid crystal display screen 5 can be and active or passive matrix one. The thin film transistor liquid crystal screen 5 is commonly called a multi-color TFT-LCD (standing for "Thin-Film Transistor Liquid Crystal Display" in English) screen and allows the formation of an image by the image generating device 3.

The image generating device 3 therefore forms an image with the help of the liquid crystal display screen 5.

Downstream of he screen 5 in the direction of movement of the light beams, the display device 1 comprises at least one semi-reflecting lamina or area 7, of straight or slightly curved shape in cross-section, and a first reflection device 8 and a second reflection device 9 interposed in the path of the image between the screen 5 and the semi-reflecting lamina 7.

The first reflecting device 8 is for example a flat mirror (in English, this mirror is often Called a "folding mirror") whilst the second reflecting device 9 is a concave defecting mirror (in English, this mirror is often called a "freeform mirror") allowing for the enlargement of the projected image. As will be seen in more detail below, the deflecting mirror 9 is mounted in a pivoting and motor-driven manner in so that it can be pivoted about a pivoting axis 17 (shown in FIG. 7), which in particular makes it possible to adapt the height of the image produced with respect to the user whose eye 12 is represented in a diagrammatic manner.

The semi-reflecting lamina or area 7, which can be formed by a specifically treated area of the windscreen of the vehicle, forms a semi-reflective display area receiving light beams from the HUD equipment generated by said image generator 3.

This semi-reflective lamina or area 7 has for example a reflective power at least equal to 20%, which allows the user to see the road traveled by the vehicle through the lamina 7 whilst allowing him to see the reflected image displayed superimposed on the environment.

In this FIG. 1, the path of the image is symbolized by three arrows 11 drawn in dotted line which are reflected on the reflection devices 8 and 9 before being displayed through the semi-reflecting lamina 7.

The latter makes it possible, via an enlargement and/or by transparency, a display of the image beyond the semi-reflecting lamina, notably beyond the windscreen of the vehicle, at the level of a virtual screen 13.

Certain elements of the structure of the head-up display device 1 according to the invention will now be described with reference to FIGS. 2 to 7.

As can be seen in FIGS. 2 to 4 and 7, the deflecting mirror 9 is carried by a mirror holder 15 articulated about the pivoting axis 17 (see FIG. 7 in particular).

For this purpose, the mirror holder 15 comprises a first spindle 19 borne by a protrusion 21 and cooperating with a lateral bearing plate 23 as well as a second spindle 25 (see FIG. 2) borne by a rear protrusion 27 from the holder and cooperating with a rear bearing plate 29 (see FIG. 4). It can therefore be seen that the mirror 9, by pivoting the mirror holder 15, can pivot angularly, which in particular makes it possible to adjust the height of the image displayed on the virtual screen 13.

In order to produce this pivoting, the head-up display device 1 comprises a motor-driven system 31 for pivoting the mirror (see FIG. 3 in particular), comprising a motor unit 33 fixed for example in a housing or on a base.

This motor-driven system comprises a connecting rod 35 extending in a direction perpendicular to the pivoting axis 17 and a first end portion 37 of which is articulated onto the mirror holder 15 and of which second end portion 39, opposite to the first one 37, is engaged with a rotary output member 41 of the motor unit 33.

Thanks to this connecting rod 35 mechanism, it is possible to place the motor unit 33 at a distance from the output mirror 9 so that the arrangement of the various elements of the head-up display device 1 can be away from the zone of the light rays and invisible from outside of the equipment and away from the inlet of sunlight in order to adapt more easily to small spaces.

More specifically, the motor unit 33 is disposed in a zone which is optically dead for said head-up display device 1.

"Optically dead zone" is understood to mean a zone where, even with fortuitous external illumination, for example sunrays which come from the exterior into the housing of the display device (not shown), reflected rays do not reach the virtual screen 13 of the display device 1, notably on the windscreen. This optically dead zone is notably away from the path of the light rays transmitted from the image generating device 3 to the reflection devices 8 and 9. Thus, the situation does not occur in which for example a part of the motor unit 33 would appear visible by the user on the virtual screen 13, or by a passer-by outside of the equipment.

The first end portion 37 is articulated onto the mirror holder 15 close to an edge for example the upper edge 43, distant from the pivoting axis 17.

In fact, the farther the articulation of the connecting rod 35 is away from the pivoting axis 17, the longer is the path to be traveled by the connecting rod 35 in order to apply a movement of rotation/pivoting to the deflecting mirror 9. Thus, it is possible to use drive motors with a lower resolution whilst remaining accurate for the movement of the deflecting mirror 9.

More precisely, the first end portion 37 of the connecting rod 35 is engaged with an actuating spindle 45 borne by the mirror holder 15 and parallel with the pivoting axis of the mirror 17.

With regard to the second end portion 39 of the connecting rod 35, this is engaged with a tenon 47 borne by a rotary disk 49 driven by the motor unit 33. The motor unit 33 comprises for example a stepper motor and a motor reducer whose output shaft drives the rotary disk 49. The stepper motor can be a standard motor with a rotation greater than 0.25° per step, notably 0.3° per step.

As can be seen in FIGS. 5 and 6, the cooperation of the actuating spindle 45 and the tenon 47 with the connecting rod 35 is carried out by the intermediary of openings 51 respectively engaged with the actuating spindle 45 and the tenon 47.

In more detail, each opening 51 has a portion with a generally "V" or "U" shape, the bottom 55 of which has a spacing less than the diameter of the actuating spindle 47 or of the tenon 47 with which it cooperates.

The result of this is that the actuating spindle 45 or the tenon 47 is always engaged with the lateral walls 57 of the opening 51, which converge for example with a slope of less than 10°, such that any problems of play due to tolerance, both along the axis of the connecting rod 35 and perpendicular to that axis, are eliminated. Hysteresis problems are also eliminated.

As can be seen in FIGS. 2 to 6, the openings 51 are for example open in the direction of a base 59 of the head-up display device 1 (see FIG. 2), which facilitates assembly.

In order to ensure contact and a firm engagement of the actuating spindle 45 and the tenon 47 with the lateral sides 57, even in the case of vibration of the vehicle, an elastic element 61, notably a spring element, is provided at each end portion 37 and 39.

By way of example, the spring element 61 is a helical tension spring of which one end is engaged with the connecting rod 35 and of which the other end is engaged with an associated anchoring point 65, 67, disposed such that the sprig 61 is substantially perpendicular to the axis of the connecting rod 35 and perpendicular to the pivoting axis 17.

Because of the substantially perpendicular orientation of the spring 61, no force is applied by these springs in the direction of translation of the connecting rod such that the motor unit 33 can remain small.

According to a variant which is not shown only one spring can be provided of which one end is engaged with the connecting rod 35 in the center of the latter and hooked onto the base 59. Moreover, the elastic element can comprise a leaf spring, a compression spring or elastomer elements.

For the end of the spring 61 engaged with the connecting rod 35, the latter comprises for example in each end portion 37, 39 a cut-out hook 71 serving as an engagement point for the helical spring 63.

In order to have a good gear ratio between the pivoting of the mirror 9 on the one hand and the rotation of the rotary disk 49 on the other hand, without using an interfering angle and being sufficiently distant from the optical zone of the rays, the distance between the openings 51 is between 40 mm and 160 mm, notably 90 mm.

In operation, in order to adjust the height of the virtual image on the virtual screen 13, it suffices to turn the rotary disk 49 through several very small steps, that is to say through a small angle, which has the effect of pushing or pulling the connecting rod 35 in such a way that the mirror holder 15 and therefore also the mirror 9 itself pivots very slightly, by a very small amount.

By way of example, thanks to the system 31 with the connecting rod 35, about four steps of a standard 0.3° stepper motor corresponds to a pivoting angle of the deflection mirror 9 of about 0.15°, which is the precision required for being able to correctly positioning the projected image. Moreover, because of the effective elimination of tolerance and hysteresis effects, any vibration problem which could occur when the vehicle is in motion is also avoided.

Thanks to the convergent openings 51, tolerance and hysteresis problems have therefore been eliminated. This assembly also makes it possible to use a standard and inexpensive stepper motor.

The invention claimed is:

1. A head-up display device comprising:
   a deflecting mirror held by a mirror holder articulated about a pivoting axis; and
   a motor-driven system for moving the deflecting mirror in a pivoting manner, comprising a motor unit and a connecting rod extending in a direction perpendicular to the pivoting axis,
   wherein a first end portion of the connecting rod is engaged with an actuating spindle carried by the mirror holder and parallel with the pivoting axis of the mirror, in an articulated manner, and a second end portion of the connecting rod, opposite to the first end portion, is engaged with a rotary output member of the motor unit,
   wherein the connecting rod comprises, at each of the first and the second end portions, an opening respectively engaged with the actuating spindle and the tenon, and
   wherein each opening has a portion with a generally "V" or "U" shape whose bottom has a spacing less than the diameter of the actuating spindle or of the tenon with which the opening cooperates.

2. The display device as claimed in claim 1, wherein the motor unit is placed in an optically dead zone for said display device.

3. The display device as claimed in claim 1, wherein the first end portion of the connecting rod is articulated onto the mirror holder close to an edge, distant from the pivoting axis.

4. The display device as claimed in claim 1, wherein the second end portion of the connecting rod is engaged with a tenon carried by a rotary disk driven by the motor unit.

5. The display device as claimed in claim 1, wherein said openings are open in the direction of a base of the head-up display device.

6. The display device as claimed in claim 1, further comprising, for each of the first and the second end portions, an elastic spring element, respectively maintaining the actuating spindle and the tenon engaged with the lateral walls of the "V" or "U" shaped portion.

7. The display device as claimed in claim 6, wherein the spring element is a helical tension spring one end of which is engaged with the connecting rod and another end of which is engaged with an associated anchoring point disposed so that the spring is substantially oriented perpendicular to the axis of the connecting rod and perpendicular to the pivoting axis.

8. The display device as claimed in claim 7, wherein the connecting rod comprises, in each of the first and the second end portions, a cut-out hook serving as an engagement point at one end of the helical spring.

9. The display device as claimed in claim 1, wherein the distance between the openings is between 40 mm and 160 mm.

10. The display device as claimed in claim 1, wherein the motor unit comprises a motor reducer.

* * * * *